INVENTOR
ARTHUR H. DICKINSON
BY
Joseph C. Sweet, Jr.
ATTORNEY

INVENTOR
ARTHUR H. DICKINSON
BY Joseph C. Sweet, Jr.
ATTORNEY

United States Patent Office 2,755,536
Patented July 24, 1956

2,755,536

METHOD OF PRODUCING TRANSISTORS HAVING SUBSTANTIALLY UNIFORM CHARACTERISTICS

Arthur H. Dickinson, Greenwich, Conn., assignor to International Business Machines Corporation, New York, N. Y., a corporation of New York Application November 7, 1951, Serial No. 255,266

6 Claims. (Cl. 29—25.3)

This invention relates to the manufacture of transistors and more particularly to a method of producing transistors having substantially uniform characteristics.

The transistor was initially described in an article by Bardeen and Brattain in the "Physical Review," vol. 74, pp. 230–231, July 15, 1948. It has since been described in greater detail in an article by the same authors in the "Physical Review," vol. 75, pp. 1208–1225, April 15, 1949.

Since that time the various forms of transistors have been produced, including the coaxial transistor, the junction transistor, the phototransistor, the fieldistor, and transistors having more than three electrodes. These are described in the following articles:

Kock and Wallace: "Coaxial transistors," Electrical Engineering, vol. 68, pp. 222–223, March 1949;

Shockley et al.: "p-n Junction transistors," Physical Review, vol. 83, pp. 151–162, July 1, 1951;

Shive: "The phototransistor," Bell Laboratories Record, vol. 28, pp. 337–342, August 1950;

Stuetzer: "A crystal amplifier with high input impedance," Proceedings of The I. R. E., vol. 38, pp. 868–871, August 1950;

Haegele: "Crystal-tetrode mixer," Electronics, vol. 22, pp. 80–81, October 1949; and, Reich et al.: "Effect of auxiliary current on transistor operation," Journal of Applied Physics, vol. 22, pp. 682–3, May 1951.

Briefly, the basic transistor comprises a small block of semi-conductor material to which are applied at least three electrodes, termed base, collector, and emitter, respectively. The semi-conductor material may be of either n-type, indicating that the charges in the material normally available for carrying current are negative, i. e., electrons, or p-type, indicating that the charges in the material normally available for carrying current are positive, i. e., "holes." It has been found that germanium is a particularly suitable semi-conductor material, and the usual type of germanium employed is n-type. When potentials are properly applied between the base and each of the other two electrodes, a translating device is produced wherein variations in current in the collector-base or output circuit are produced by variations in current in the emitter-base or input circuit.

The theory and operation of the transistor are described in detail in the above articles.

The achievement of translating action in a semi-conductor is realized only after the crystal of the chosen material is prepared in accordance with carefully controlled processes and techniques. In the case of germanium, the basic material is germanium-dioxide and typical treatment of this material to produce a crystal suitable for use in a transistor is described in United States Patent No. 2,497,770 granted to Robert L. Hansen on February 14, 1950.

One major difficulty in the production of transistors has been an inability to produce transistors having substantially uniform characteristics. Referring now to point contact transistors, the type initially developed, those skilled in the art have taught that the exact electrical characteristics which a semi-conductor crystal will possess after the application of the point contact collector and emitter electrodes to its treated surface are dependent not only on the crystal itself, but also on such factors as shape of the electrode points, force of the electrodes on the crystal surface, separation between the electrodes, and impedance of the surface area contacted by an electrode.

It is possible, through the use of extreme care, to maintain the first three of these latter four factors to very close tolerances, but unfortunately the last factor to a very considerable extent determines the electrical characteristics of the transistor. This is because a crystal surface is inherently non-uniform in its electrical properties, as those who in their youth experimented with crystal sets well remember. Small areas varying from high to low impedance are intermixed in a variegated pattern, although impedance variations on the crystal surface are noticeably reduced when the semi-conductor is a "single" crystal.

So far as has been determined by many observations upon point contact transistors utilizing n-type germanium, the electrical characteristics of each appear to be relatively unaffected by the impedance of the area contacted by the emitter electrode. On the other hand, these characteristics are very much affected by the impedance of the area contacted by the collector electrode. The higher the impedance of the area contacted by the collector, the flatter are the collector current voltage characteristics for increasing collector voltages. Further, the higher the impedance of this area, the smaller is the region wherein current amplification exists and the larger the region wherein voltage amplification exists.

It is therefore seen that the obtaining of transistors having substantially similar electrical characteristics may be a matter of repeated application of the point contact electrodes to different surface locations on the crystal with repeated determination of the characteristics. This process of obtaining transistors suitable for interchange in the circuits in which they are employed is obviously laborious but, prior to my invention, was the only process known to those skilled in the art. Further repeated searching of the surface as required frequently resulted in damage to the components of the transistor, thus requiring the substitution of replacement components and a repetition from the beginning of the assembly process.

Accordingly, the principal feature of my invention is the provision of a method for producing transistors having substantially uniform characteristics, and furthermore such a method obviating the necessity for repeated searching of the transistor surface when point contact transistors are being manufactured.

Other features of my invention will be pointed out in the following description and claims and illustrated in the accompanying drawings, which disclose, by way of example, the principle of my invention and the best mode, which has been contemplated of applying that principle.

Briefly, in accordance with my invention successive progressively increasing pulses of energy are applied during the manufacture of a transistor to one of its electrodes, preferably the collector in the case of *n*-type semi-conductor body material. These pulses may conveniently be applied while the collector current versus collector voltage characteristics for different values of emitter current are being observed, as on the screen of a cathode ray tube oscilloscope, but this continuous observation is, of course, not necessary.

Figure 1:
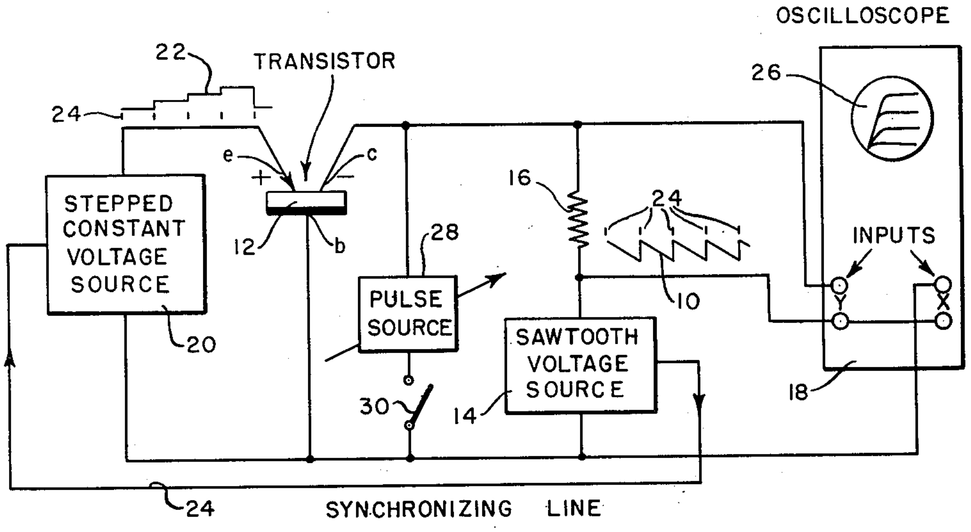
Fig. 1 illustrates in block diagram form a suitable circuit for obtaining transistor characteristics, modified for use in accordance with my invention.

A suitable arrangement is shown in Fig. 1, wherein a negative voltage 10 having a repetitive sawtooth waveform, as illustrated, is applied between the base *b* and collector *c* of transistor 12 from sawtooth voltage source 14. Collector *c* is connected to sawtooth voltage source 14 through resistance 16, the voltage across resistance 16 thus being a measure of the current in the collector circuit. The terminals of resistance 16 are individually connected to the respective "Y," or vertical input terminals of oscilloscope 18. In order to obtain the desired collector characteristics for different values of constant emitter voltage, a stepped constant voltage source 20 is connected between emitter *e* and base *b* of transistor 12, the stepped waveform 22 of the emitter voltage being of "staircase" form as indicated on the diagram. Timing marks 24 are included adjacent each of waveforms 10 and 22 to indicate that each step of waveform 22 coincides with the duration of exactly one sawtooth of waveform 10, this synchronization being insured because of the provision of synchronizing line 24 connected between sawtooth voltage source 14 and stepped constant voltage source 20. Further, the period of each sawtooth of waveform 10 and each step of waveform 22 is equal to the duration of one horizontal traverse or sweep of the electron beam of oscilloscope 18. This is because the "X," or horizontal input terminals of oscilloscope 18 are connected across the output of sawtooth voltage source 14 as shown. The circuit thus far described produces on the screen of oscilloscope 18 a reproduction of the collector current/voltage characteristics of the transistor 12, as indicated at 26. However, to carry out my invention, I further provide a source 28 of variable-potential pulses, shown connected between collector *c* and base *b* of transistor 12 through switch 30.

It is to be understood that in the conventional manufacture of point-contact transistors, transistor 12 will be initially prepared as described in the above articles and patent and that the emitter and collector electrodes will be positioned on the treated crystal surface with a chosen force and with a chosen distance therebetween. Purely by way of example, I have utilized *n*-type germanium crystals removed from commercial type 1N48 crystal diodes with emitter and collector electrodes made of platinum—10% iridium wire 0.003″ in diameter, chisel pointed, spaced apart 0.001″ and resting on the treated crystal surface with a force of 20 grams. The electrode conventionally secured to the opposite surface of the commercial 1N48 crystal serves as the base electrode for the transistor.

Figure 2:
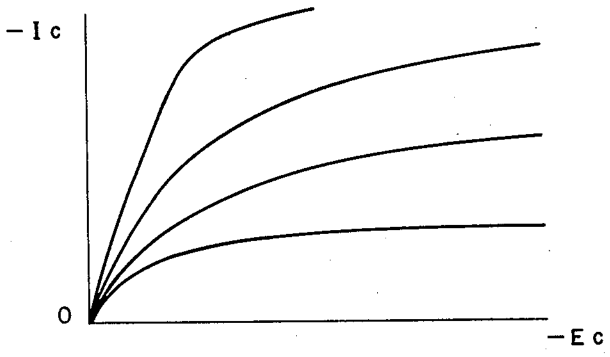
Figs. 2 and 3 illustrate typical characteristics of untreated transistors.
Figure 3:
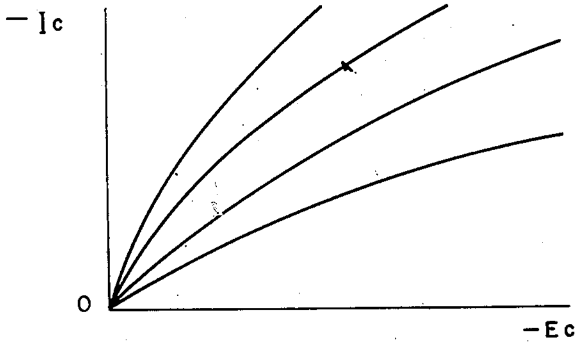

When such a transistor 12 is connected in the circuit of Fig. 1, the characteristics produced may be similar to those shown in Fig. 2 or they may be similar to those shown in Fig. 3. For clarity of the drawings, I have shown in each of Figs. 3–5 only four curves of the infinite multitude making up the family of curves. The lowermost curve of collector current versus collector voltage is that for the emitter voltage equal to zero volts, and the other three curves, going from the bottom to the top, are for arbitrary constant increments of emitter voltage. I have thus labelled these last three curves $E_e=1$, 2 and 3, respectively.

At this point it may be noted that, alternatively, similar curves for constant increments of emitter current may be utilized if desired. This can be achieved by substituting a stepped constant current source for stepped constant voltage source 18 in Fig. 1.

After examining the initial characteristics of the transistor under test as displayed on the screen of oscilloscope 18, I preferably apply an initial positive pulse of short duration between the collector and base electrodes of the transistor and then again observe the transistor characteristics. Invariably, it will be found that if the initial characteristic is similar to that shown in Fig. 3, after an initial application of a positive pulse of short time duration and small magnitude the characteristic will approach that shown in Fig. 2. If the initial characteristic is similar to that shown in Fig. 2, it will be found that after the application of the initial pulse the characteristic will approach that shown in Fig. 4.

Preferably pulse source 28 includes a condenser which may be charged up to progressively increasing values of potential, either automatically after each discharge or by means of the manual control indicated, the condenser then being discharged through the transistor electrode to which it is connected when switch 30 is closed momentarily. In one embodiment, I utilized a 10 microfarad condenser and charged this condenser progressively in 5 volt steps from 15 to 50 volts between each application of energy pulses to the transistor electrode. As the successive progressively increasing pulses of energy are applied to the transistor electrode, it will be found that the transistor characteristics become substantially identical with those shown in Fig. 4, which are very desirable characteristics for a voltage amplifier type of transistor.

Figure 4:
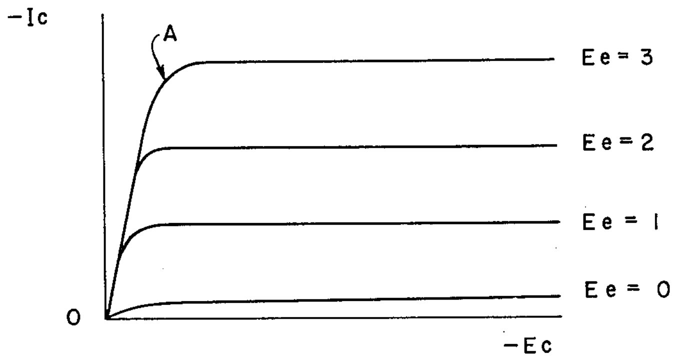
Figs. 4 and 5 illustrate typical characteristics of transistors treated in accordance with my invention.

Note that in Fig. 4 the linear region of each collector current/voltage curve extends over a major portion of the collector voltage range and that the collector current/voltage curve for the emitter voltage equal to zero is very close and substantially parallel to the abcissa. Note also that while this curve ($E_e=0$) has been rotated to the right about the zero axis from its position in Figs. 2 and 3, as well as being brought closer to and more parallel with the abcissa, the left-hand portion or knee of the uppermost curve ($E_e=3$), indicated by the reference letter A, has been moved toward the left from its position in Figs. 2 and 3. Thus while from certain portions of the characteristics it would appear that the impedance of the collector circuit had been reduced, from other portions it would appear that the collector circuit impedance had been increased, an anomolous situation but a very desirable one. Certainly, however, no one would have been able to predict this result.

I have found that best results are obtained when an initial positive pulse of approximately 15 volts is applied to the collector electrode as set forth above and that, continuing with successive voltage pulses increasing in 5 volt steps, the transistor characteristics of Fig. 4 are usually achieved after a 40 volt pulse has been applied. It is to be noted, however, that in some instances the characteristics of Fig. 4 are achieved for smaller or larger voltage values of the applied pulse. The pulsing is, of course, stopped when the desired characteristics of Fig. 4 are achieved. It is also to be noted that the magnitudes of both the initial and the last pulse applied are greater than the "peak forward voltage," which is commonly of the order of 5 volts for n-type high inverse-voltage germanium.

If transistors of the current amplification type are desired, the pulsing with progressively increasing voltages may be continued after the characteristics of Fig. 4 are produced, and the characteristics will then shift back to the type shown in Fig. 3 pulsing again being stopped when the desired characteristics (now of the current amplification type) are produced.

As set forth above, the pulses are applied to the collector electrode in the forward direction of current conduction, and hence for n-type germanium the pulses are of positive polarity. It is believed that the effect of such pulses is to repel, i. e., cause diffusion of the positive ions away from the potential barrier adjacent the surface of the crystal contacted by the collector electrode. The thickness or impedance of the potential barrier is a function of the density of the positive impurity ions and the less dense the ions become, the greater becomes the barrier impedance.

In some instances, it will be found that the initial positioning of the collector and emitter electrodes does not produce the desired characteristics when the pulsing method outline above is carried out. In such instances, it will usually be found that a repositioning of the electrodes on the crystal surface will produce the desired characteristics after the application of successive progressively increasing pulses of energy to the collector electrode in accordance with my invention.

Figure 5:
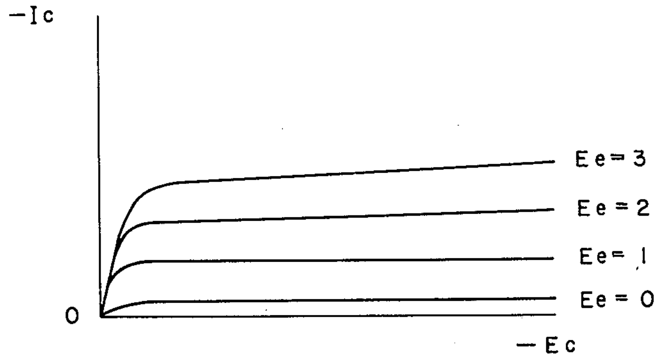

Also, occasionally, it will be found that the characteristics of a transistor produced by the application of successive progressively increasing pulses of energy are similar to those shown in Fig. 5. Note that, while, as desired, the collector current/voltage curve for the value of emitter voltage equal to zero lies very close to and parallel with the abcissa, the highest collector current/voltage curve ($E_e=3$) indicates that not very much current is passing through the collector circuit inasmuch as Figs. 4 and 5 are drawn to the same scale. However, the characteristic curves of Fig. 4 can usually be produced from such a transistor by repositioning the emitter on the surface of the transistor while maintaining the position of the treated collector fixed. It will usually be found that the desired movement of the emitter is toward the collector in order to change the characteristics from those of Fig. 5 to those of Fig. 4.

It is, of course, desirable that the characteristics of a transistor remain stable during normal jarring, etc., and usually transistors treated in accordance with my invention are mechanically stable as well as electrically stable.

However, occasionally a transistor will exhibit microphonics when tapped even though it has achieved the characteristics shown in Fig. 4 as successive progressively increasing pulses of energy are applied to the collector electrode. This condition is usually easily remedied by connecting the upper terminal of pulse source 28 to emitter *e* instead of collector *c* and applying successive progressively increasing pulses of energy to that electrode. In fact, it will frequently be found that a single 10, 15 or 20 volt pulse in the forward direction of current conduction is sufficient to stabilize the transistor mechanically without materially affecting the desired collector characteristics previously obtained through treatment of the collector electrode.

In certain instances, even though the transistor does not exhibit microphonics, it may be desirable nevertheless to apply my pulsing treatment to the emitter electrode after the above described treatment of the collector. The effect of applying successive progressively increasing pulses of energy, as described above, to the emitter electrode is a generally flattening of the collector characteristics similar to that produced by treatment of the collector electrode, but of considerably less degree than when the treatment is applied to the collector. I have found that the collector characteristics do not change radically until the magnitude of the progressively increasing pulses applied to the emitter exceeds about 70 or 75 volts. If the potential of the applied pulse is increased further, the collector characteristics become less and less flat and then suddenly rise, changing from the type of characteristic shown in Fig. 4 to that shown in Fig. 3. This latter effect may be attributable to a chemical change in the crystalline structure, resulting in a change in the potential barrier.

It is therefore seen that the desired predetermined collector characteristics of a transistor may be provided in accordance with my invention by applying successive progressively increasing pulses of energy to the collector electrode alone or to both the collector and emitter electrodes, preferably the collector being treated first.

While, as pointed out above I prefer to employ pulses of energy of a polarity to cause current conduction in the forward direction, the use of pulses of opposite polarity, causing current conduction in the reverse direction, does permit some adjustment of the collector characteristics. The degree of adjustment is, however, considerably less than that obtained when my treatment is employed to cause current conduction in the forward direction. I believe that this is because my preferred treatment involves high currents inasmuch as the impedance then offered by the crystal is characteristically low. On the other hand, the treatment causing current conduction in the reverse direction involves low currents since the impedance of the crystal is then high. It would appear that the extent to which the impedance of an electrode applied to the surface of a transistor may be changed is a function of the power applied and that may preferred method allows a greater range of power magnitudes to be employed.

There is one further advantage in employing progressively increasing pulses of polarity to cause current conduction in the forward direction. One characteristic of semi-conductors is that they exhibit positive resistance up to a certain maximum negative potential termed the "differential voltage" or "peak back voltage." When the potential applied exceeds this value, the resistance of the semi-conductor becomes negative and the current therethrough can virtually instantaneously rise to a ruinously high value. There is no apparent sign-post as to when this differential voltage is about to be reached for a specific crystal when pulses of a polarity to cause current conduction in the reverse direction are employed. Up to this point, the output or collector characteristics change very slightly, as pointed out above. When the differential voltage value is reached or passed, the transistor may burn out or, if it survives, the output characteristics are usually different from those desired.

Figure 6:
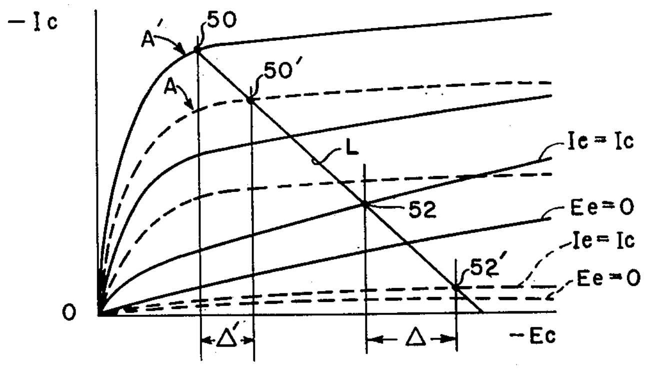
Fig. 6 shows superposed characteristics of a transistor before and after treatment in accordance with my invention together with a typical load line, and is helpful in explaining the advantages of transistors so treated.

It is believed that a reference to Fig. 6 will readily demonstrate the material advantages of the collector characteristics of a transistor achieved through treatment thereof in accordance with my invention. In Fig. 6, I have shown in solid lines typical initial characteristics of a transistor (similar to those shown in Fig. 2) and in dotted lines I have indicated the resultant collector characteristics of the transistor after treatment in accordance with my invention, these resultant dotted-line characteristics being similar to those shown in Fig. 4. For clarity of the drawings, I have shown only four curves for the treated and untreated condition of the transistor, respectively, the lowest curve being for zero emitter voltage and the second lowest curve being for the condition where the emitter current is equal to the collector current for a reason which will be apparent shortly. I have drawn a single load line L from the "knee" A′ of the uppermost curve for the untreated condition to illustrate the advantages of a transistor treated in accordance with my invention in a trigger circuit, for example.

In such a trigger circuit the two stable conditions of operation are found at the point where this load line intersects the uppermost curve (this intersection being designated by the reference numeral 50) and the point where the load line intersects the second curve from the bottom, i. e., the curve for $I_e=I_c$, this latter point being designated by the reference numeral 52. It is, of course, desirable in order to insure reliable operation of the trigger circuit that the collector voltages for these two conditions be as far removed as possible from one another and it will be apparent from a comparison of the separation of points 50 and 52 for the collector characteristics of the untreated transistors with the separation of the similar points 50′ and 52′ for the characteristics of the treated transistor that these operating points are more widely removed from one another after treatment of the transistor in accordance with my invention. In other words, the shift △ between points 52 and 52' is greater than the shift △' between points 50 and 50'. It is, of course, also apparent that, if the initial characteristics of the transistor were similar to those shown in Fig. 3 rather than those shown in Fig. 2, point 50' (for the treated transistor) would lie to the left of point 50 (for the untreated transistor) rather than to the right as shown in Fig. 6, thus increasing even further the separation of the values of collector voltage at the two stable conditions of trigger operation. In other words, the separation is then increased by △ plus △', rather than △ minus △'.

While I have thus demonstrated that the transistor characteristics produced in accordance with my invention are very advantageous for trigger circuit operation, it will also be apparent to those skilled in the art that the characteristics thus produced are very advantageous for voltage amplification purposes since, as is well known, extension of the permissible voltage swing along the load line in the manner which I have described for trigger circuit operation is in addition precisely the desideratum of a voltage amplifier.

While there have been shown, described and pointed out the fundamental novel features of my invention as applied to a preferred embodiment, it will be understood that various omissions and substitutions and changes in the form and details of the device illustrated and in its operation may be made by those skilled in the art without departing from the spirit of the invention. It is my intention, therefore, to be limited only as indicatd by the scope of the following claims.

For example, while I have described my invention as applied to n-type germanium transistors of the point contact type it will, of course, be apparent to those skilled in the art that, utilizing the same principles, my treatment may be applied to p-type germanium and in fact to any transistor regardless of the particular semi-conductor material utilized in the body, regardless of the conductivity type of the semi-conductor material, etc. Further, my method is not dependent upon the particular type of electrodes used, although I prefer to utilize point contact electrodes of platinum—10% iridium rather than tungsten because when the former are used, a physical bonding or welding of the treated electrodes to the semi-conductor material is usually effected. On the other hand, when a tungsten electrode is utilized, so far as I have been able to determine, no welding is secured, the electrode merely digging a crater into the semi-conductor surface to a depth determined by the number of steps employed during the treatment of the electrode.

What is claimed is:

1. In the manufacture of transistors, each having point-contact emitter and collector electrodes, the improvement for producing substantially uniform characteristics for each that comprises applying, to the collector electrode, successive very short and intense D. C. pulses of progressively increasing intensity, and thereafter moving the emitter electrode relative to the collector electrode to vary the spacing therebetween and the current carrying capacity of the transistor.

2. In the manufacture of transistors, each having point-contact emitter and collector electrodes, the improvement for producing substantially uniform characteristics for each that comprises applying, to the collector electrode, successive very short and intense D. C. pulses of progressively increasing intensity, thereafter moving the emitter electrode relative to the collector electrode to vary the spacing therebetween and the current carrying capacity of the transistor, and finally applying at least one pulse of energy to the emitter electrode.

3. In the manufacture of transistors, each including a semiconducting body, a base electrode in contact with said body, and an emitter electrode and a collector electrode, the improvement for producing substantially uniform characteristics for each that comprises the steps of positioning said emitter and collector electrodes in contact with said body, applying an electrical current in the reverse direction between said collector and base electrodes and in the forward direction between said emitter and base electrodes, and simultaneously impressing a short and intense pulse of current in the forward direction between said collector and base electrodes.

4. In the manufacture of transistors, each including a semiconducting body, a base electrode in contact in said body, and an emitter electrode and a collector electrode, the improvement for producing substantially uniform characteristics for each that comprises the steps of positioning said emitter and collector electrodes in contact with said body, applying an electrical current in the reverse direction between said collector and base electrodes and in the forward direction between said emitter and base electrodes and simultaneously impressing a short and intense pulse of current in the forward direction between said collector and base electrodes, interrupting said current flow, and thereafter moving said emitter electrode relative to said collector electrode for final operation of said transistor in electrical circuits.

5. In the manufacture of transistors, each including a semiconducting body, a base electrode in contact in said body, and an emitter electrode and a collector electrode, the improvement for producing substantially uniform characteristics for each that comprises the steps of positioning said emitter and collector electrodes in contact with said body, applying an electrical current in the reverse direction between said collector and base electrodes and in the forward direction between said emitter and base electrodes and simultaneously impressing a short and intense pulse of current in the forward direction between said collector and base electrodes, interrupting said current flow, thereafter moving said emitter electrode relative to said collector electrode, and finally, impressing a short and intense pulse of current in the forward direction between said emitter and base electrodes.

6. In the manufacture of transistors, each including a semiconducting body, a base electrode in contact in said body, and an emitter electrode and a collector electrode, the improvement for producing substantially uniform characteristics for each that comprises the steps of positioning said emitter and collector electrodes in contact with said body, applying an electrical current in the reverse direction between said collector and base electrodes and in the forward direction between said emitter and base electrodes and simultaneously impressing a short and intense pulse of current in the forward direction between said collector and base electrodes, interrupting said current flow, and moving said emitter electrode toward said collector electrode and into contact with said body for final operation of the transistor in electrical circuits.

References Cited in the file of this patent

UNITED STATES PATENTS

| | | |
|---|---|---|
| 2,446,467 | Fry | Aug. 3, 1948 |
| 2,514,879 | Lark-Horovitz et al. | July 11, 1950 |
| 2,524,035 | Bardeen et al. | Oct. 3, 1950 |
| 2,561,411 | Pfann | July 24, 1951 |
| 2,577,803 | Pfann | Dec. 11, 1951 |